(12) United States Patent
Aulicino

(10) Patent No.: US 7,192,240 B2
(45) Date of Patent: Mar. 20, 2007

(54) ROLL UP RAMP SYSTEM

(76) Inventor: Kenneth M. Aulicino, 8 Fenner Dr., Newton, NJ (US) 07860

( * ) Notice: Subject to any disclaimer, the term of this patent is extended or adjusted under 35 U.S.C. 154(b) by 19 days.

(21) Appl. No.: 11/145,896

(22) Filed: Jun. 6, 2005

(65) Prior Publication Data

US 2006/0214456 A1    Sep. 28, 2006

Related U.S. Application Data

(63) Continuation-in-part of application No. 11/089,731, filed on Mar. 25, 2005.

(51) Int. Cl.
*B62D 33/023* (2006.01)
*B65G 69/03* (2006.01)

(52) U.S. Cl. .......................... 414/537; 14/69.5; 296/61

(58) Field of Classification Search .................. 296/50, 296/51, 57.1, 60, 61, 62; 14/69.5, 71.1; 160/133, 160/211; 414/537, 921, 430, 480
See application file for complete search history.

(56) References Cited

U.S. PATENT DOCUMENTS

| | | | |
|---|---|---|---|
| 288,455 A | 11/1883 | Landes | 182/164 |
| 1,004,575 A | 10/1911 | Jones | 59/78 |
| 1,570,014 A | 1/1926 | Stevens | 474/228 |
| 2,424,320 A | 7/1947 | Kilbourn | 66/156 |
| 2,602,345 A | 7/1952 | Braumiller | 74/251 |
| 3,586,393 A | 6/1971 | Myers | 305/35 R |
| 4,024,595 A | 5/1977 | Brown | 14/1 |
| 4,596,417 A * | 6/1986 | Bennett | 296/61 |
| 4,979,867 A * | 12/1990 | Best | 414/537 |
| 5,312,148 A * | 5/1994 | Morgan | 296/61 |
| 5,347,672 A | 9/1994 | Everard et al. | 14/69.5 |
| 5,400,733 A * | 3/1995 | Richter | 114/258 |
| 6,059,344 A * | 5/2000 | Radosevich | 296/61 |
| 6,079,072 A | 6/2000 | Katsiri | 14/2.4 |
| 6,463,613 B1 | 10/2002 | Thompson | 14/69.5 |
| 6,643,878 B2 | 11/2003 | Schmaltz et al. | 14/69.5 |
| 6,722,721 B2 | 4/2004 | Sherrer et al. | 296/61 |
| 6,837,669 B2 * | 1/2005 | Reed et al. | 414/537 |
| 6,928,959 B1 * | 8/2005 | Trauernicht et al. | 119/847 |
| 7,082,637 B1 * | 8/2006 | Griffin | 14/69.5 |
| 2002/0145300 A1 * | 10/2002 | Webber | 296/61 |
| 2004/0032142 A1 * | 2/2004 | Sherrer et al. | 296/61 |
| 2006/0123568 A1 * | 6/2006 | Zhang | 14/69.5 |

* cited by examiner

*Primary Examiner*—D. Glenn Dayoan
*Assistant Examiner*—Paul Chenevert
(74) *Attorney, Agent, or Firm*—Ernest D. Buff & Associates, LLC; Ernest D. Buff; Hanganet A. La Croix

(57) ABSTRACT

A roll up ramp system facilitates transition between a first elevation and a second higher elevation. The roll up ramp system includes a plurality of load-bearing links connected to one another having top and bottom faces and being comprised of at least one load-bearing member and a set of side plates. Each side plate has at least two apertures appointed for receiving and housing a pin, or the like, for pivotally connecting the load bearing links to one another. The load-bearing links are adapted to rotate about the pin to form an extended ramp configuration and a roll up configuration when force is applied to the roll up ramp structure. The roll up ramp is adapted to achieve a rigid, durable ramp configuration, which is readily utilized for loading equipment into a hauling device. Advantageously, the roll up configuration achieved by the ramp structure provides for convenient storage thereof.

24 Claims, 4 Drawing Sheets

ROLL UP RAMP SYSTEM

This is a Continuation-In-Part of application Ser. No. 11/089,731, filed Mar. 25, 2005, the disclosure of which is hereby incorporated in its entirety by reference thereto.

BACKGROUND OF THE INVENTION

1. Field of the Invention

The invention relates to a roll up ramp system for loading and unloading machinery from a hauling vehicle; and more particularly, to a ramp system that can be rolled up for storage and unrolled to form a durable, rigid ramp capable of releasable attachment to the hauling vehicle.

2. Description of the Prior Art

Today's active society calls for the hauling and transporting of a variety of equipment and machinery, such as lawn mowers, snow blowers, snow mobiles, JET SKI™s (personal watercrafts (PWCs)), ATVs and the like. Loading machinery of this kind, which is generally heavy and cumbersome in nature, into a hauling vessel, such as a truck or wagon, is often times difficult and tiresome. To avoid actually lifting the machinery, which might require several persons, ramp structures are widely utilized. Foldable or collapsible ramp structures provide an especially convenient means for loading machinery into the hauling vessel. After the machinery is loaded into the vessel, the ramp structure can be folded or collapsed for storage.

Foldable or collapsible ramp structures heretofore disclosed and utilized are bulky by nature and design. That is to say, many of the foldable or collapsible ramps generally have multiple ramp spans or slats that interlock by way of ramp links or flexible straps. These ramp structures have common disadvantages. They are generally cumbersome to arrange in both the ramp and folded configurations, and they are heavy. Still other designs utilizing linking configurations that lock to form bridges or ladders provide inadequate support. They are inconvenient to use, and are frequently incapable of supporting heavy loads. Furthermore, the ramp structures heretofore disclosed and utilized do not enable convenient secure attachment to the hauling vessel. For example, many of the ramp structures heretofore disclosed and utilized provide for securement of the ramp to the hauling vessel by way of a magnetic portion, a hinge, or through friction via application of a non-skid surface.

U.S. Pat. No. 5,347,672 to Everard et al. discloses a portable, stow-able knock-down ramp structure having several elongated tread plates, each provided with a leading edge and a trailing edge adapted to accommodate a cylindrical hinge rod so that the plates are pivotally connected together. The cylindrical hinge rod extends the full width of each plate and interconnects the leading edge of one plate with the trailing edge of another plate. U.S. Pat. No. 6,079,072 to Katsiri discloses a foldable and rigid space spanning structure including a frame assembly having a pair of spaced poles and a number of hinged sections aligned so that the poles and material can be folded in sections. The hinged sections are interconnected so that the structure folds with the plates piling on-top of one another, so that an accordion type folding configuration is accomplished rather than a roll-up configuration.

U.S. Pat. No. 6,722,721 to Sherrer et al. discloses a foldable pickup truck tailgate and ramp device having a series of rigid panels that are the same sized as a standard tailgate and being interconnected by hinge means so that the panels are capable of folding up, flat, into a pickup tailgate assembly configuration. The plates are linked so that they are folded in an accordion configuration as opposed to a roll-up configuration. U.S. Patent Application No. 2002/0088065 to Schmaltz et al. discloses a loading ramp structure having a plurality of relatively small rectangular links joined end to end to form a desired length and adapted to form a rigid ramp and to be rolled-up for storage. The vertical edge of each rectangular link in the Schmaltz et al. structure must be carefully aligned with the next adjacent link to produce rigidity sufficient for a useable ramp. None of these references disclose a ramp configuration that is comprised of a plurality of links formed of a lightweight rod construction that enables the ramp to be lightweight and easily rolled for storage.

Various foldable or collapsible ramp structures heretofore disclosed and utilized have multiple ramp spans or slats that interlock by way of ramp links or flexible straps. These ramps have a tendency to be bulky and heavy due to the nature of the links utilized in the configuration. In particularly, U.S. Pat. No. 6,463,613 to Thompson discloses a portable ramp having a central load bearing portion formed by several light weight, transversely positioned slates that are pivotally connected to one another by several flexible straps. A pair of strong, light weight braces rotates into a longitudinal position along the ramp sides to form rigid support of the central ramp portion. U.S. Pat. No. 6,643,878 to Schmaltz et al. discloses a loading ramp device which rolls up for convenient storage and is comprised of a plurality of relatively small rectangular links that are jointed end to end to form a ramp that can be rolled up for storage.

Chain linking configurations that link and lock to form ladders, bridges, or chains have heretofore been disclosed and utilized, however, theses apparatuses do not provide support and ready convenience, and may not be capable of supporting heavy loads. In such configurations, the vertical edge of each link must be carefully aligned with the next adjacent link to produce rigidity sufficient for a useable ramp. U.S. Pat. No. 288,455 to J. K. Landes provides a folding ladder formed by a series of sections pivoted to each other by rungs and having spring-hooks or clamping-frames for locking the sections together to form a ladder. U.S. Pat. No. 1,004,575 to Jones discloses a flat link chain having aligning elements that are hingedly connected together by pins that are adapted in use to cooperate with notched out parts on each of the elements. U.S. Pat. No. 1,570,014 to Stevens discloses a sprocket chain having central links with pivot openings and side links which are held in connection with the central links by pivot pins in the usual manner. U.S. Pat. No. 2,424,320 to Kilbourn provides a chain having parallel selvedge chains built up of flat, "FIG. 8" form pressed steel links that are pierced with a pivot hole and having cross bars which extend across from one selvedge chain to the other. U.S. Pat. No. 2,602,345 to Braumiller discloses a chain link and chain device formed therewith having side links with a semicircular projecting nose connected to axial openings of rollers using rivet pins and is configured so that when the chain is straightened resistance to flexing in one direction is achieved. U.S. Pat. No. 3,586,393 to Myers discloses a conveyor structure including a pair of chains having a plurality of links in the form of shoes, cross-pins and side links that are connected to and carried by the cross-pins. U.S. Pat. No. 4,024,595 to Brown discloses a linkage bridge consisting of a plurality of links rotate-ably coupled in an end-to-end relationship to form an elongated structural platform with a rotational stop between each adjacent link. None of these references disclose a ramp configuration that is comprised of a plurality of links formed of a light-weight rod construction that enables the ramp to be lightweight and easily rolled for storage.

Significantly, none of the foldable ramps or chain, ladder, or bridge structures provides a rolled up configuration that is capable of supporting heavy loads when in the straight or ramp formation, and which is additionally capable of being rolled up for storage. None of the ramps disclosed or utilized provide a ramp structure that is capable of handling heavy loads associated with equipment, including lawn mowers, JET SKI™s (versonal watercrafts (PWCs)), snowmobiles, ATV s and the like.

For the foregoing reasons, there exists a need in the art for a ramp system capable of being readily rolled up for convenient storage which, when unrolled, readily forms a ramp having strength sufficient to carry heavy loads. Specifically, there exists a need in the art for a roll up ramp system that provides a durable rigid ramp configuration adapted for loading machinery, such as lawn mowers, snow blowers, JET SKI™s (personal watercrafts (PWCs)), snowmobiles, ATV s and the like, into a hauling device, such as a truck. Additionally, there is a need in the art for a roll up ramp system having a plurality of links interconnected to form a roll up ramp that is provided with rotation capability between each of the links so that the links can be rolled in one direction on top of one another to from a rolled up configuration when force is applied. Moreover, there is a need in the art for a ramp system capable of achieving a ramp configuration with exertion of minimal force. For the forgoing reasons there exists a need in the art for a roll up ramp system that is lightweight, strong, conveniently stored in a rolled up condition and readily deployed in an unrolled, ramp-like configuration to facilitate loading and unloading equipment from a hauling vehicle.

SUMMARY OF THE INVENTION

The present invention provides a lightweight ramp system that is readily rolled up for convenient storage and which, when unrolled, facilitates transition between a first elevation and a second, higher elevation, such as the tailgate of a vehicle, the landing associated with a flight of stairs, the top of a loading dock, or the like. When placed in the unrolled condition, the system forms a ramp that is strong enough to effect loading and unloading of power equipment or other similar item, such as a wheelchair bound person from a hauling vehicle. The roll up ramp system includes a plurality of load-bearing links, each being adapted to connect to one another to form the roll up ramp system. Each of the load-bearing links has a top face and a bottom face and further comprises at least one load-bearing member, such as a rod, bolt or rivet, and a set of side plates. The side plates have at least two apertures adapted to receive a connecting means. The load-bearing links are pivotally connected by the connecting means so that the load-bearing links are adapted to rotate into an extended ramp configuration and rolled up configuration when a force is applied.

The extended ramp configuration of the roll up ramp system is achieved when force is applied to the top face of each of the load-bearing links, thereby engaging the extended ramp configuration. The rolled up configuration of the roll up ramp system is achieved when force is applied to the bottom face of each of the load-bearing links, thereby engaging the load-bearing links in a rolled up configuration.

The roll up ramp system may further include a securement device adapted to temporarily attach the ramp to a structural element at a higher elevation, such as the tailgate portion of a hauling vehicle. The securement device comprises a heavy-duty interwoven cloth material adapted to be attached under the tailgate portion of the hauling device. Alternatively, the securement device comprises a left and right hook composed of steel, metal, or plastic material. In this embodiment, the hooks are adapted to be temporarily hooked over the tailgate portion of the hauling device. The securement device may also be wrapped around the tailgate portion of the hauling vehicle and attached to the underside of the ramp.

Optionally, the roll up ramp system further comprises at least one load-bearing bar extending from the top face of each of the load-bearing links. The load-bearing bar provides further strength to the ramp system, and has particular applications when the ramp is utilized to load very heavy equipment.

The roll up ramp system is composed of a light weight metal or plastic material. This light weight structure enhances the convenience factor of the roll up ramp system. As a result, the lightweight, durable, ramp structure can be readily rolled up for storage and easily deployed from a rolled up condition to a ramp configuration. It can be readily adapted for use as temporary ramping for wheelchair access to non compliant buildings. For example, the roll up ramp system can be placed on stairs to accommodate wheelchairs as a temporary fix.

The roll up ramp system is comprised of a dual ramp system having dual roll up ramps. Each of the dual roll up ramps has a width ranging from ½–2.5 feet. Alternatively, the roll up ramp system is comprised of a unilateral ramp system. The unilateral ramp system is comprised of a unilateral roll up ramp that has a width ranging from 2–6 feet.

The roll up ramp system is adapted to support a load associated with machinery selected from the group consisting of a lawn mower, rotary tiller, fertilizer spreader, snow blower, snow mobile, JET SKI™s (personal watercrafts (PWCs)), or an all terrain vehicle. It can also be adapted to accommodate larger equipment such as land vehicles. Optionally, the roll up ramp system further comprises a storage bag, or dual storage bags, adapted for housing the roll up ramp when the roll up ramp is in the rolled up configuration.

Each of the load-bearing links comprising the roll up ramp system has a length ranging from ¼–1 feet. Preferably, each of the links comprising the roll up ramp system has a length ranging from ½–¾ foot. Each of the load-bearing members has a width ranging from 6 inches to seventy-two inches. Optionally, the roll up ramp system has a length ranging from 4–12 feet when in the extended ramp configuration. Preferably, the roll up ramp system has a length of 8 feet when in the extended ramp configuration.

The top face of the load-bearing links may be coated with a non-skid surface material. Alternatively, the top face of the load-bearing links has treaded grooves thereon. Optionally, the top face of each of the load-bearing links has a plurality of holes or perforations. The holes can have at least one side that is an arc. The non-skid surface material, treaded grooves, and perforations serve to cause friction between the roll up ramp system and the object traversing the system (i.e. lawn mower, etc.), while providing additional strength, to provide optimum loading capability and minimize slippage.

In another embodiment, the roll up ramp system includes a securement device, a plurality of load-bearing links each having a top face and a bottom face and comprising a load-bearing member, such as a rod, bolt or rivet, and a set of side plates. Each of the side plates has a locking portion and an extending portion. The locking portion of the side plates is interconnected by the load-bearing member, which extends therebetween.

Each of the side plates has first and second apertures adapted to receive a connecting means. The first aperture is located on the locking portion of each of the side plates, while the second aperture is located on the extending portion of each of the side plates. The load-bearing links are pivotally connected by way of the connecting means received by the apertures so that the load-bearing links are adapted to rotate in an extended ramp configuration and a rolled up configuration when a force is applied.

The present invention provides a roll up ramp kit that enables rapid assembly of the roll up ramp, so that the ramp can be constructed easily and shipped economically. The roll up ramp kit comprises a securement device and a plurality of load-bearing links. The securement device is adapted to temporarily attach the roll up ramp system to the tailgate portion of the hauling device. The load-bearing links are adapted to connect to one another to form the roll up ramp system. Each of said load-bearing links has a top face and a bottom face and further comprises a load-bearing member and a set of side plates. Each of the side plates has a locking portion and an extending portion.

The locking portion of the side plates is interconnected by the load-bearing member, which may be a rod extending therebetween, or which can be a bolt or rivet that does not extend the entire width of the link. Each of the side plates has first and second apertures adapted to receive a connecting means. The first aperture is located on the locking portion of each of the side plates. The second aperture is located on the extending portion of each of the side plates. Each of the load-bearing links is pivotally connected by way of the connecting means received by the apertures so that the load-bearing links are adapted to rotate in an extended ramp configuration and a fell rolled up configuration when a force is applied.

BRIEF DESCRIPTION OF THE DRAWINGS

The invention will be more fully understood and further advantages will become apparent when reference is had to the following detailed description, appended claims, and accompanying drawings, in which:

DESCRIPTION OF THE PREFERRED EMBODIMENTS

The present invention provides a roll up ramp system for facilitating transition between a first elevation and a second, higher elevation, such as a tailgate portion of a land vehicle, the landing associated with a flight of stairs, a loading dock, or the like. Generally stated, the rollup ramp system comprises a plurality of load-bearing links each having a top face and a bottom face and further comprising at least one load-bearing member and a set of side plates. Each of the load-bearing links is connected to one another to form the roll up ramp system. The side plates have at least two apertures adapted to receive a connecting means. The load-bearing links are pivotally connected by the connecting means so that the load-bearing links are adapted to rotate into an extended ramp configuration and a rolled up configuration when a force is applied. These elements are arranged to form a roll up ramp adapted to from a ramp configuration and a rolled up configuration as force is applied. The ramp configuration of the roll up ramp system is achieved when force is applied to the top surface of each of the links. The rolled up configuration of the roll up ramp system is achieved when force is applied to the bottom surface of each of the links.

Chain link rigidity is provided when the links are flexed in one direction but not in the opposing direction, whereupon the flexible connection is achieved. As a result, the structure has sufficient flexibility to be folded, for storage convenience. When the links are in the extended position the ramp structure endows the ramp configuration with sufficient rigidity to securely hold heavy objects, which traverse the top face of the link's load-bearing member during loading of an object into the bed of a hauling device. Advantageously, the ramp system provides a ramp that is readily attachable to various vehicles, such as trucks, that are utilized in hauling machinery or heavy objects. In particularly, utilization of the ramp system facilitates the transporting of lawn mowers, snow blowers, JET SKI™s (personal watercrafts (PWCs)), snowmobiles, motorcycles, snow mobiles, or the like, from one location to another by way of a hauling vehicle (i.e. truck).

Advantageously, when not in use the ramp system is conveniently removed from the carrying vehicle and rolled up for compact storage. The rolling function of the ramp is especially advantageous when the ramp is being deployed or extended, as the ramp simply can be readily unrolled with one hand. The rolling and unrolling actions can be achieved by a single person, as the ramp is light in weight and the roll up and ramp configurations are readily achieved with minimal effort. When rolling the ramp for storage, the rolling function is convenient as minimal force is required to be applied to the bottom face, which causes the rolling action.

Figure 1:
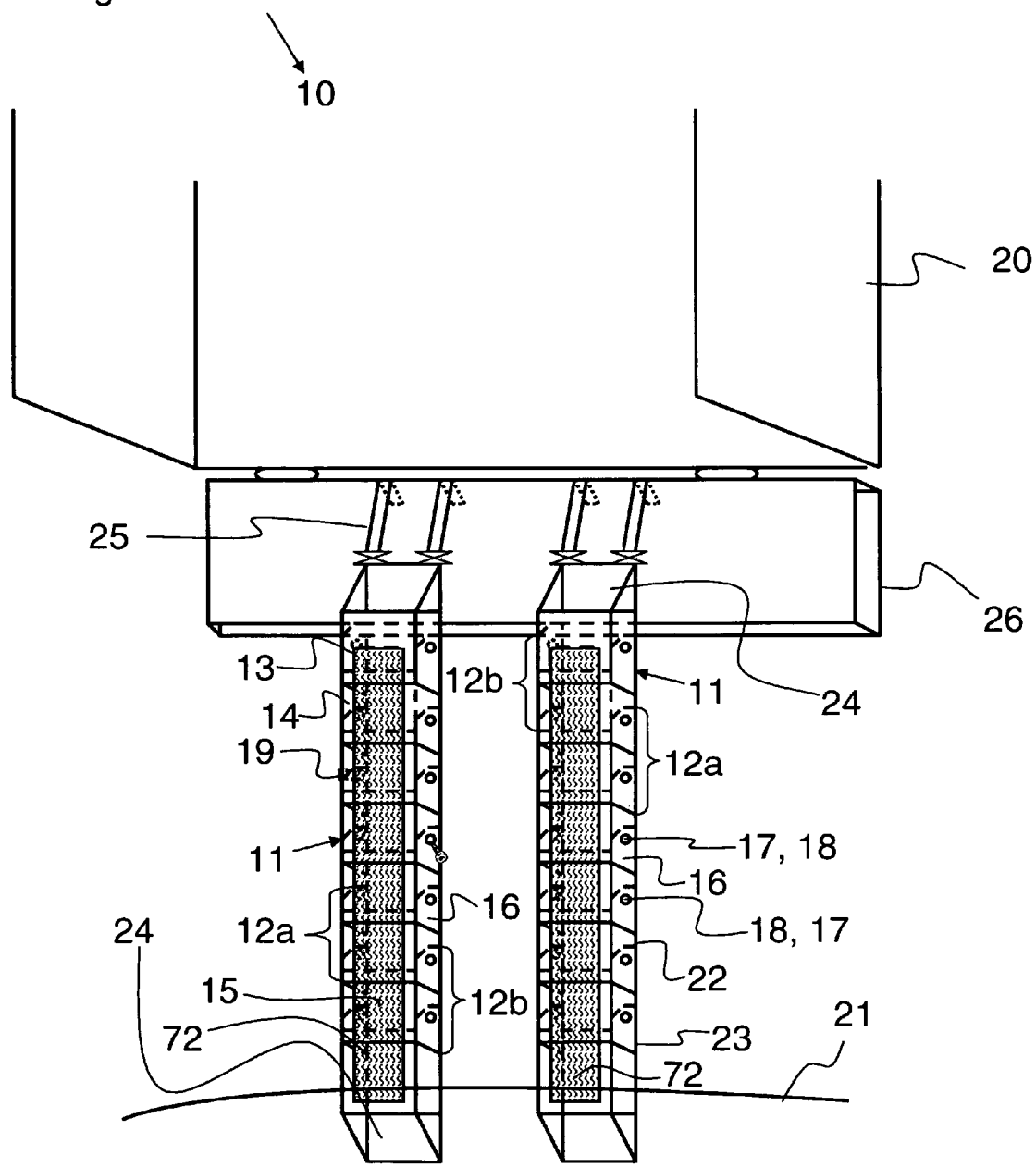
FIG. 1 is a schematic view of the roll up ramp system in the ramp configuration showing the roll up ramp as a dual roll up ramp temporarily attached to a tailgate portion of a hauling vehicle.

FIG. 1 is a schematic view of the roll up ramp system, generally shown at 10, showing the ramp configuration as a dual roll up ramp temporarily attached to a tailgate portion of a hauling device. A hauling device includes such devices as pickup trucks, sport utility vehicles, box trucks, and the like. A hauling device having a bed 20 and a tailgate portion 26 is shown. A roll up ramp 11, shown herein as dual roll up ramps 11, is temporarily attached to tailgate portion 26 by way of the optional securement device 25. Securement device 25 is adapted for temporarily attaching the roll up ramp system 10 to the tailgate portion 26 of the hauling device. The securement device 25 comprises a heavy duty interwoven cloth material adapted to be secured by a temporary knot under the tailgate portion 26 of the hauling device (shown in FIG. 4, indicated by reference numeral 130). Alternatively, and as depicted in FIG. 1, the securement device 25 comprises a left and right hook. Optionally, the securement device 25 can comprise a friction surface on the bottom face of each of the load-bearing link's.

The optional securement device 25 is interstitially connected throughout a portion of the roll up ramp, having excessive material disposed for slipping over the tailgate portion and being tied in a secure temporary attachment located under the tailgate portion 26. Alternatively, the securement device 25 comprises a left and right hook composed of a steel, metal, or plastic material. The hooks are adapted to be temporarily hooked between the bed 20 of the hauling device and tailgate portion 26. The securement device 25 may also be wrapped around the tailgate portion 26 of the hauling vehicle 20 and attached to the underside of each ramp 11.

The roll up ramps 11 are easily attached to the tailgate portion 26 by the securement device 25 while the other end of the roll up ramps 11 are placed at ground level 21 so as to form an angled ramp entry into the hauling device's bed 20. The roll up ramps 11 are comprised of a plurality of load-bearing links 12, herein the separate load-bearing links are demarcated as 12a and 12b to show their arrangement to one another. Each of the load-bearing links 12 (12a, 12b) has a top face 13 and a bottom face 14. Each of the load-bearing links 12 (12a, 12b) further comprises at least one load-bearing member 15 and a set of parallel side plates 16. Each of side plates 16 of the set of parallel side plates have at least two apertures 17 and 18 adapted to overlap one another (shown as 17, 18 or 18, 17) and receive a connecting means 19, thereby connecting adjacent load-bearing links 12a and 12b. The top face of the load-bearing members 15 may be coated with a non-skid surface material or have treaded grooves thereon, as indicated by hash marks 72.

The side plates 16 are shown herein as having a locking portion 23 and an extending portion 22. The extending portion 22 has at least two flat portions, but alternatively the extending portion 22 can have at least one arc portion. The extending portion 22 readily facilitates the inward pivoting of the ramp 11 when the ramp 11 is conformed into the rolled up configuration. The load-bearing member 15 is herein shown as a flat surface having four sides (a more in depth discussion of the arrangement is set forth in the discussion of FIG. 2). The load-bearing links 12 (12a, 12b) are pivotally connected by the connecting means 19 so that the load-bearing links 12 are adapted to rotate into an extended ramp configuration and a rolled up configuration when a force is applied.

Specifically, the ramp configuration is achieved when the ramp 11 is extended in a straight formation, and becomes rigid when force is applied to the top face 13 of the ramp 11. The ramp 11 becomes rigid as the force is applied onto a portion of each load-bearing member 15, which in turn engages with the load-bearing member 15 of the adjacent link 12 (further discussed in FIG. 2). Conversely, when force is applied to the bottom face 14 of the ramp 11, the load-bearing links 12 roll on top of one another as the links pivot around the connection means 19. The load-bearing links 12 comprising the ends of the ramp 11 may have wedged portions 24 to facilitate the traversing of the object on-to and off-of the ramp 11.

Figure 2:
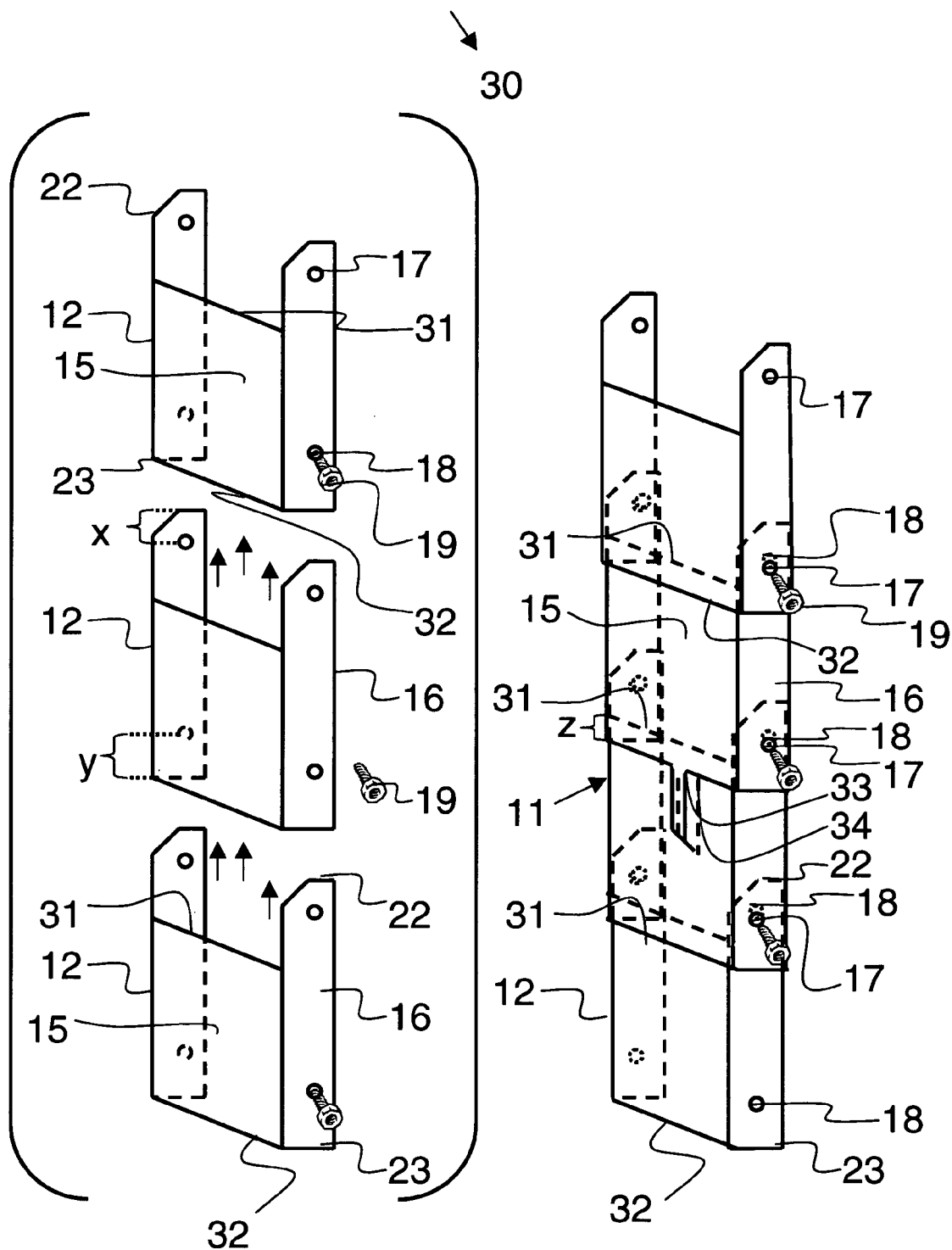
FIG. 2 is a schematic view of the of the roll up ramp system illustrating the load-bearing links and the assembly of the ramp configuration.

FIG. 2 is a schematic view of the roll up ramp system illustrating the load-bearing links and the assembly of the ramp configuration, shown generally at 30. The ramp 11 is made up of the load-bearing links 12 interconnected together by connection means 19. Each load-bearing link 12 (in FIG. 1 referred to as 12a, 12b) is comprised of a load-bearing member 15 and a set of parallel side plates 16. Side plates 16 have a locking portion (edge 23) and an extending portion (angled edge 22). The locking portion 23 of the side plates 16 are interconnected by the load-bearing member 15, which extends there between or, alternatively, by a bolt or rivet that does not extend the entire width of the link. The extending portion 22 has at least two flat portions, but alternatively the extending portion 22 can have at least one arc portion. The extending portion 22 readily facilitates the inward pivoting of the ramp 11 when the ramp 11 is conformed into the rolled up configuration. Alternatively, the side plate 16 locking portion 23 and extending portion 22 can both have an arc shape.

Each of the side plates 16 has first and second apertures 17, 18 adapted to receive connecting means 19. The first aperture 17 is located on the extending portion of each of the side plates, while the second aperture 18 is located on the locking portion of each of the side plates. The load-bearing links 12 are pivotally connected by way of the connecting means 19 received by the apertures 17, 18 so that the load-bearing links 12 are adapted to rotate in an extended ramp configuration and a rolled up configuration when a force is applied.

The side plates 16 further comprise at least two apertures, 17 and 18, located distance x and y from extending portion 22 and locking portion 23, respectively. Portions of the load-bearing members 15 of the links 12 overlap one another when the ramp confirmation is achieved. Specifically, each load-bearing member 15 has an indented end 31 and a front end 32. Front end 32 is adjacently flush with locking portion 23 of each of the parallel side plates 16. Indented end 31 of a load-bearing member 15 of a load-bearing link 12 is inserted under the load-bearing member 15 of an adjacent load-bearing link 12. When the links 12 overlap one another, aperture 17 of one link 12 is overlapped by aperture 18 of another link 12. Connection means 19 is then inserted into aperture 18 and traverses into aperture 17, thereby uniting the links 12 together. Optionally, the roll up ramp system further comprises at least one load bearing bar 33 extending from the top face of each of the load-bearing links. Correspondingly, at least one load-bearing groove 34 may be provided on the indented end 31 of the neighboring load-bearing link 12 in order to receive the load bearing bar 33. The load-bearing bar provides further strength to the ramp system, and has particular applications when the ramp has a width ranging between 4 to 6 feet and is utilized to load very heavy equipment.

Figure 3:
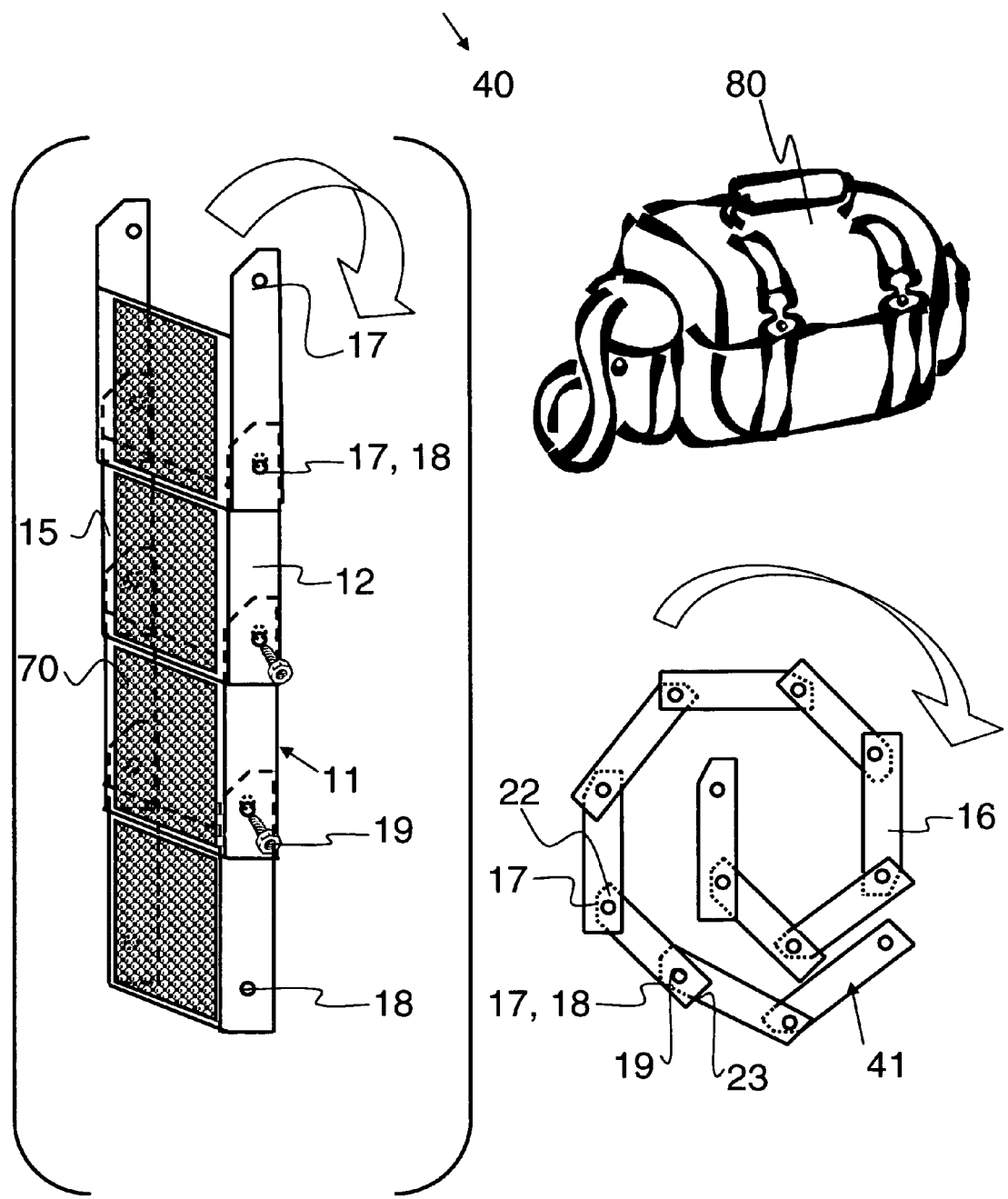
FIG. 3 is a schematic view of the roll up ramp system showing the extended ramp configuration and a lateral view of the rolled up configuration.

FIG. 3 is a schematic view of the roll up ramp system showing the extended ramp configuration and a lateral view of the rolled up configuration, shown generally at 40. Each of the plurality of load-bearing links 12 has a top face 13 and a bottom face 14. As force is applied to the bottom face 14 of the links 12 in the ramp configuration 11, the links 12 rotate about connection means 19 at apertures 17 (of a link) and 18 (of an adjacent link) to yield the rolled up ramp configuration 41. The side view of the rolled up configuration 41 is shown having a plurality of links 12 that are folded in a roll formation on top of one another. When the links 12 are unrolled and in the straightened or elongated position as the ramp configuration 11, a force is applied to the top face 13 of the links 12 causing a rigid ramp configuration 11 to result as portions of the load-bearing members 15 of the adjacent links 12 fold on top of each other.

Each of the plurality of load-bearing links comprising the roll up ramp system has a length ranging from ¼–1 foot. Preferably, each of the links comprising the roll up ramp system has a length ranging from ½–¾ foot. Each of the load-bearing members has a width ranging from 6 inches to seventy-two inches. Optionally, the roll up ramp system has a length ranging from 4–12 feet when in the extended ramp configuration. Preferably, the roll up ramp system has a length of 8 feet when in the extended ramp configuration. The load-bearing members 15 may be coated with a non-skid surface material (see FIG. 1. indicated by hash marks 72). Alternatively, the load-bearing members 15 have treaded grooves thereon (see FIG. 1, indicated by hash marks 72). The non-skid surface material and treaded grooves serve to cause friction between the roll up ramp system and an object traversing the system (i.e. lawn mower, etc.) to provide optimum loading capability and minimize slippage. In another embodiment, the top face of each of the load-bearing members 15 are appointed with a plurality of holes or perforations 70.

The roll up ramp system can be comprised of dual ramps, or a single unilateral ramp. Where the roll up ramp system is comprised of a dual ramp system each ramp is spaced a distance apart that will accommodate the wheel width base of the equipment being loaded. The roll up ramp is light in weight and easily attached to the hauling device so that the user can readily move each of the ramps to accommodate the given wheel base of the machinery being loaded. When the roll up ramp system is comprised of dual roll up ramps, each ramp has a width ranging from ½–2.5 feet. Alternatively, the roll up ramp system is comprised of a unilateral ramp system. The unilateral ramp system is comprised of a unilateral roll up ramp that has a width ranging from 2–6 feet. These dimensions enable the roll up system to be utilized for a variety of machinery. The roll up ramp system is adapted to support a load associated with machinery selected from the group consisting of a lawn mower, rotary tiller, fertilizer spreader, snow blower, snow mobile, JET SKI™ (personal watercraft (PWC)), or an all terrain vehicle. Optionally, the roll up ramp system further comprises a storage bag (shown as 80 in FIG. 3), or dual bags, adapted for housing the roll up ramp when the roll up ramp is in the rolled up configuration. Advantageously, the roll up ramp system is adapted to be rolled in one direction for storage, but locks when flexed in the opposite direction forming a durable ramp configuration.

Figure 4:
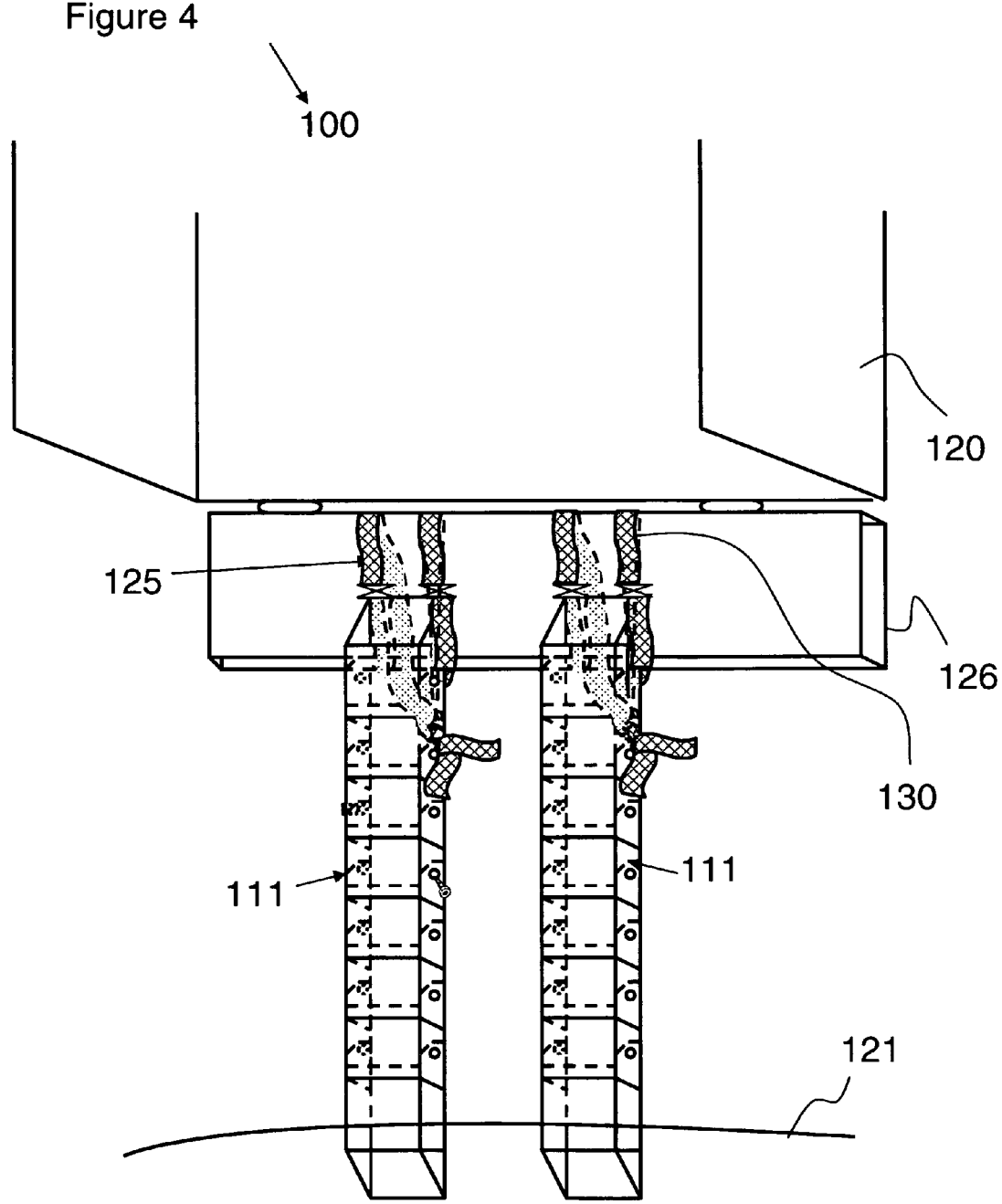
FIG. 4 is a schematic view of the roll up ramp system in the ramp configuration showing the roll up ramp as a dual roll up ramp temporarily attached to a tailgate portion of a hauling vehicle by way of a securement device comprising a heavy duty interwoven cloth material.

FIG. 4 is a schematic view of the roll up ramp system in the ramp configuration showing the roll up ramp as a dual roll up ramp temporarily attached to a tailgate portion of a hauling vehicle by way of a securement device comprising a heavy duty interwoven cloth material, shown generally at 100. A hauling device having a bed 120 and a tailgate portion 126 is shown. A roll up ramp 111, shown herein as dual roll up ramps 111, is temporarily attached to tailgate portion 126 by way of a securement device 125 so that the roll up ramps 111 extend from a ground surface 121 to tailgate portion 126. Securement device 125 is shown herein as a heavy duty interwoven cloth material 130 secured by a temporary knot under the tailgate portion 126 of the hauling device.

Having thus described the invention in rather full detail, it will be understood that such detail need not be strictly adhered to but that various changes and modifications may suggest themselves to one skilled in the art, all falling within the scope of the invention as defined by the subjoined claims.

What is claimed is:

1. A roll up ramp system for temporary connection to a tailgate portion of a hauling vehicle, comprising:
   a. a plurality of load-bearing links, each of said load-bearing links being adapted to connect to one another to form said roll up ramp system;
   b. each of said load-bearing links having a top face and a bottom face and further comprising at least one load-bearing member and a set of side plates;
   c. each of said side plates having at least two apertures adapted to receive a connecting means;
   d. each of said load-bearing links being pivotally connected by said connecting means so that said load-bearing links are adapted to rotate into an extended ramp configuration and a rolled up configuration when a force is applied;
   f. said top face of each of said load-bearing links further comprising at least one load-bearing bar extending therefrom, and said load-bearing member having at least one load-bearing groove adapted to receive said load-bearing bar;
   whereby said extended ramp configuration of said roll up ramp system is achieved when said force is applied to said top face of each of said load-bearing links, thereby engaging said extended ramp configuration, and said rolled up configuration of said roll up ramp system is achieved when said force is applied to said bottom face of each of said load-bearing links, thereby engaging said load-bearing links in a rolled up configuration.

2. A roll up ramp system for temporary connection to a tailgate portion of a hauling vehicle as recited by claim 1, wherein said roll up ramp system further comprises a securement device, said securement device being adapted to temporarily attach said roll up ramp system to said tailgate portion of said hauling device.

3. A roll up ramp system for temporary connection to a tailgate portion of a hauling vehicle as recited by claim 2, wherein said securement device comprises left and right hooks, said hooks being adapted to be hooked under said tailgate portion of said hauling device and being composed of steel, metal, or plastic material.

4. A roll up ramp system for temporary connection to a tailgate portion of a hauling vehicle as recited by claim 1, wherein said roll up ramp system is composed of a lightweight metal material.

5. A roll up ramp system for temporary connection to a tailgate portion of a hauling vehicle as recited by claim 1, wherein said roll up ramp system is composed of a lightweight plastic material.

6. A roll up ramp system for temporary connection to a tailgate portion of a hauling vehicle as recited by claim 1, wherein said roll up ramp system comprises a dual ramp system.

7. A roll up ramp system for temporary connection to a tailgate portion of a hauling vehicle as recited by claim 6, said dual ramp system being comprised of dual roll up ramps each having a width ranging from ½–2.5 feet.

8. A roll up ramp system for temporary connection to a tailgate portion of a hauling vehicle as recited by claim 1, wherein said roll up ramp system is comprised of a unitary roll up ramp having a width ranging from 2–6 feet.

9. A roll up ramp system for temporary connection to a tailgate portion of a hauling vehicle as recited by claim 1, wherein said roll up ramp system is adapted to support a load associated with machinery selected from the group consisting of a lawn mower, rotary tiller, fertilizer spreader, snow blower, snow mobile, personal watercraft (PWC), or an all terrain vehicle.

10. A roll up ramp system for temporary connection to a tailgate portion of a hauling vehicle as recited by claim 1, said roll up ramp system further comprising a storage bag adapted for housing said roll up ramp when said roll up ramp is in said rolled up configuration.

11. A roll up ramp system for temporary connection to a tailgate portion of a hauling vehicle as recited by claim 1, wherein each of said load-bearing members has a width ranging from 6 inches to seventy-two inches.

12. A roll up ramp system for temporary connection to a tailgate portion of a hauling vehicle as recited by claim 1, wherein each of said load-bearing members has a length ranging from ¼–1 foot.

13. A roll up ramp system for temporary connection to a tailgate portion of a hauling vehicle as recited by claim 12, wherein each of said load-bearing members has a length ranging from ½–¾ foot.

14. A roll up ramp system for temporary connection to a tailgate portion of a hauling vehicle as recited by claim 1, wherein said roll up ramp system has a length ranging from 4–12 feet when in said extended ramp configuration.

15. A roll up ramp system for temporary connection to a tailgate portion of a hauling vehicle as recited by claim 14, wherein said roll up ramp system has a length of 8 feet when in said extended ramp configuration.

16. A roll up ramp system for temporary connection to a tailgate portion of a hauling vehicle as recited by claim 1, said top face of each of said load-bearing links having a plurality of holes or perforations.

17. A roll up ramp system for temporary connection to a tailgate portion of a hauling vehicle as recited by claim 16, wherein said holes have at least one side that is an arc.

18. A roll up ramp system for temporary connection to a tailgate portion of a hauling vehicle as recited by claim 1, said top face of each of said load-bearing links being coated with a non-skid surface material.

19. A roll up ramp system for temporary connection to a tailgate portion of a hauling vehicle as recited by claim 1, said top face of each of said load-bearing links having treaded grooves thereon.

20. A roll up ramp system for temporary connection to a tailgate portion of a hauling vehicle as recited by claim 1, said ramp system being additionally used for wheelchair access to a non-compliant building.

21. A roll up ramp system for temporary connection to a tailgate portion of a hauling vehicle, comprising:
   a. a securement device, said securement device being adapted to temporarily attach said roll up ramp system to said tailgate portion of said hauling device, wherein said securement device comprises a heavy duty interwoven cloth material adapted to be tied under said tailgate portion of said hauling vehicle;
   b. a plurality of load-bearing links, said load-bearing links being adapted to connect to one another to form said roll up ramp system;
   c. each of said load-bearing links having a top face and a bottom face and further comprising a load-bearing member and a set of side plates, each of said side plates having a locking portion and an extending portion, said locking portion of said side plates being interconnected by said load-bearing member extending therebetween;
   d. each of said side plates having first and second apertures adapted to receive a connecting means, said first aperture being located on said locking portion of each of said side plates, said second aperture being located on said extending portion of each of said side plates;
   e. each of said load-bearing links being pivotally connected by way of said connecting means received by said apertures so that said load-bearing links are adapted to rotate in an extended ramp configuration and a rolled up configuration when a force is applied;
   wherein said extended ramp configuration of said roll up ramp system is achieved when said force is applied to said top face of each of said load-bearing links, thereby creating said extended ramp configuration; and wherein said rolled up configuration of said roll up ramp system is achieved when said force is applied to said bottom face of each of said load-bearing links, thereby creating said rolled up configuration.

22. A roll up ramp system for temporary connection to a tailgate portion of a hauling vehicle as recited by claim 21, said top face of each of said load-bearing links having treaded grooves thereon.

23. A roll up ramp system, for facilitating transition between a first elevation and a second, higher elevation, comprising:
   a. a securement device, said securement device temporarily connecting said roll up ramp system to said second, higher elevation;
   b. a plurality of load-bearing links, said load-bearing links being adapted to connect to one another to form said roll up ramp system;
   c. each of said load-bearing links having a top face and a bottom face and further comprising a load-bearing member and a set of side plates, each of said side plates having a locking portion and an extending portion, said locking portion of said side plates being interconnected by said load-bearing member extending there between;
   d. each of said side plates having a first aperture and a second aperture adapted to receive a connecting means, said first aperture being located on said locking portion of said side plate, and said second aperture being located on said extending portion of said side plate;
   e. each of said load-bearing links being pivotally connected by way of said connecting means received by said apertures, so that said load-bearing links are adapted to rotate into an extended ramp configuration and a rolled up configuration when a force is applied;
   g. said top face of each of said load-bearing links further comprising at least one load-bearing bar extending therefrom, and said load-bearing member having at least one load-bearing groove adapted to receive said load-bearing bar;
   whereby said extended ramp configuration of said roll up ramp system is achieved when said force is applied to said top faces of said load-bearing links, thereby engaging said load-bearing links in said extended ramp configuration, and said rolled up configuration of said roll up ramp system is achieved when said force is applied to said bottom faces of said load-bearing links, thereby engaging said load-bearing links in said rolled up configuration.

24. A roll up ramp kit, comprising:
   a. a securement device, said securement device being adapted to temporarily attach said roll up ramp system to a tailgate portion of a hauling device;
   b. a plurality of load-bearing links, said load-bearing links being adapted to connect to one another to form said roll up ramp system;
   c. each of said load-bearing links having a top face and a bottom face and further comprising a load-bearing member and a set of side plates, each of said side plates having a locking portion and an extending portion, said locking portion of said side plates being interconnected by said load-bearing member extending there between;
   d. each of said side plates having first and second apertures adapted to receive a connecting means, said first aperture being located on said locking portion of each of said side plates, said second aperture being located on said extending portion of each of said side plates;
   e. each of said load-bearing links being pivotally connected by way of said connecting means received by said apertures so that said load-bearing links are adapted to rotate in an extended ramp configuration and a rolled up configuration when a force is applied;

f. said top face of each of said load-bearing links further comprising at least one load-bearing bar extending therefrom, and said load-bearing member having at least one load-bearing groove adapted to receive said load-bearing bar;

wherein said extended ramp configuration of said roll up ramp system is achieved when said force is applied to said top face of each of said load-bearing links, thereby creating said extended ramp configuration; and wherein said rolled up configuration of said roll up ramp system is achieved when said force is applied to said bottom face of each of said load-bearing links, thereby creating said rolled up configuration.

* * * * *